(12) United States Patent
Endo

(10) Patent No.: US 7,397,602 B2
(45) Date of Patent: Jul. 8, 2008

(54) FLUORESCENT MICROSCOPE

(75) Inventor: Hideaki Endo, Hino (JP)

(73) Assignee: Olympus Corporaton, Tokyo (JP)

( * ) Notice: Subject to any disclaimer, the term of this patent is extended or adjusted under 35 U.S.C. 154(b) by 180 days.

(21) Appl. No.: 11/018,480

(22) Filed: Dec. 21, 2004

(65) Prior Publication Data
US 2005/0152029 A1 Jul. 14, 2005

(30) Foreign Application Priority Data
Jan. 8, 2004 (JP) ............... 2004-002887

(51) Int. Cl.
G02B 21/06 (2006.01)
(52) U.S. Cl. ..................... 359/388; 356/317
(58) Field of Classification Search ........................ None
See application file for complete search history.

(56) References Cited

U.S. PATENT DOCUMENTS 5,861,985 A * 1/1999 Ikoh ........................... 359/388
6,154,282 A 11/2000 Lilge et al.
2002/0020818 A1 * 2/2002 Mitchell et al. ........... 250/459.1
2002/0181095 A1 * 12/2002 Ruehl et al. ................. 359/385
2003/0103662 A1 * 6/2003 Finkbeiner ................. 382/128

FOREIGN PATENT DOCUMENTS

| JP | 2001-154103 | 6/2001 |
| JP | 2001-154103 A | 6/2001 |
| JP | 2002-131648 A | 5/2002 |
| JP | 2002-131648 | 5/2003 |
| JP | 2003-180616 | 7/2003 |

* cited by examiner

Primary Examiner—Stephone B. Allen
Assistant Examiner—Derek S Chapel
(74) Attorney, Agent, or Firm—Frishauf, Holtz, Goodman & Chick, P.C.

(57) ABSTRACT

A fluorescent microscope is provided which includes a light source having a small light emitting element, an illumination optical system which leads light from the light source onto a specimen, an observation optical system to which fluorescence emitted from the specimen is led, an imager which images the fluorescence led to the observation optical system, and a controller which controls turning on and turning off of the small light emitting element synchronously with imaging timing of the imager.

10 Claims, 4 Drawing Sheets

FLUORESCENT MICROSCOPE

CROSS-REFERENCE TO RELATED APPLICATIONS

This application is based upon and claims the benefit of priority from prior Japanese Patent Application No. 2004-002887, filed Jan. 8, 2004, the entire contents of which are incorporated herein by reference.

BACKGROUND OF THE INVENTION

1. Field of the Invention

The present invention relates to a fluorescent microscope using small light emitting elements such as a plurality of LEDs as a light source.

2. Description of the Related Art

Fluorescence observation is widely known in which particular molecules of a biological cell are visualized and distribution of its molecules can be observed.

A fluorescent microscope has been known as a microscope for the fluorescence observation which applies illumination light (excitation light) only having particular wavelength components to a specimen to observe fluorescence produced in the specimen. A mercury lamp, halogen lamp or the like is used as a light source of the illumination light in the fluorescent microscope, and a wavelength selection filter called an excitation filter is used for the illumination light emitted from the light source to extract the particular wavelength components of the illumination light, which are applied as the excitation light to the specimen.

The fluorescent microscope as described above requires space to mount various filters, and these light sources of the illumination light are large and generate large amount of heat, and thus are not easily handled.

Recently, high-luminance light emitting diodes (LEDs) have been developed as small light emitting elements, and the LED emitting white light, among others, has come into use as the illumination light in various fields. Moreover, some LEDs are monochromatic and various emission wavelengths are available, so that they tend to be used as the light source of illumination light in the microscope such as the fluorescent microscope. The use of LEDs as the illumination light source of the microscope allows many advantages to be expected, such as elimination of maintenance, smaller illumination devices, lower power consumption and a reduction in heat generation, by taking advantage of a small size, longer life and low heat generation which are characteristics of the LEDs.

Jpn. Pat. Appln. KOKAI Publication No. 2001-154103 discloses the use of LEDs as the illumination light source of a microscope, wherein an array of white LEDs is used to eliminate various adjustments during exchange of lamps, and a changeover between bright field/dark field observations of the microscope can be carried out by changing lighting parts in the same LED array, thereby obtaining an illumination device which saves space and provides satisfactory operability. Jpn. Pat. Appln. KOKAI Publication No. 2002-131648 discloses that a wavelength band of about several tens of nanometers of a monochromatic LED is used for illumination in a fluorescent microscope to realize a fluorescent microscope which does not need the excitation filter and saves space. Jpn. Pat. Appln. KOKAI Publication No. 2002-131648 further discloses that the excitation light illumination by the LEDs is implemented by a transmitted or incident-light dark field optical system to enable highly sensitive fluorescence observation with an improved signal-to-noise ratio (S/N)

On the other hand, in the fluorescence observation by the fluorescent microscope, because a sample is used which has been dyed in advance with various kinds of fluorescent dyes, an observation light amount is not sufficient due to deterioration of the fluorescent dyes over time which is so-called fading.

Thus, in order to permit irradiation of the excitation light only during observation or photographing, a mechanical shutter is disposed in front of the illumination light source, and the mechanical shutter is closed except during observation or photographing to block the excitation light so that the fading of fluorescence is reduced. The reason that the mechanical shutter is used here includes such facts that it is not necessary to open and close the shutter in a short period of time because the mercury lamp or halogen lamp used as a conventional light source requires time to relight after once turned off, and because it takes time for the lamp to stabilize its light emission.

BRIEF SUMMARY OF THE INVENTION

The present invention provides a fluorescent microscope which can reduce the fading of a specimen due to unnecessary irradiation of excitation light and which can achieve power saving as well.

A fluorescent microscope according to one aspect of the present invention includes: a light source having a small light emitting element; an illumination optical system which leads light from the light source onto a specimen; an observation optical system to which fluorescence emitted from the specimen is led; an imager which images the fluorescence led to the observation optical system; and a controller which controls turning on and turning off of the small light emitting element synchronously with imaging timing of the imager.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
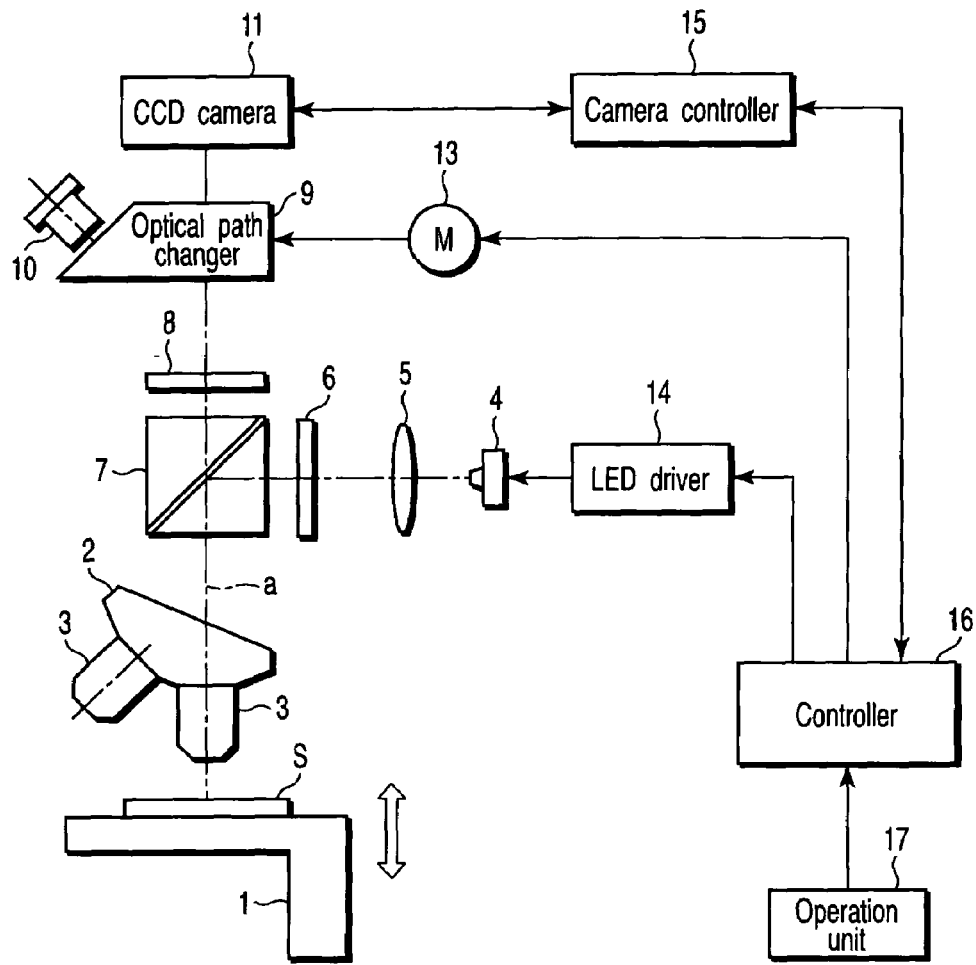
FIG. 1 is a diagram showing a schematic configuration of a fluorescent microscope according to a first embodiment of the present invention.

Embodiments of the present invention will be described below referring to the drawings.

First Embodiment

FIG. 1 is a diagram showing a schematic configuration of a fluorescent microscope according to a first embodiment of the present invention.

In FIG. 1, a specimen S is mounted on a stage 1. The stage 1 is capable of vertical movement in an optical axis direction (arrow direction indicated in the drawing) so that the specimen S can be focused on.

An objective lens 3 is disposed above the stage 1 in proximity to the specimen S. A plurality of objective lenses 3 (only two of them are shown in the drawing) with different magnifications is held to a revolver 2, and the desired objective lens 3 is selectively positioned on an observation optical path a by the operation of the revolver 2.

A collector lens 5 and an excitation filter 6 that configure an illumination optical system are disposed on an optical path of light emitted from an LED 4 as a small light emitting element which is an illumination light source. The collector lens 5 converts the light from the LED 4 into parallel light. The excitation filter 6 transmits light having a wavelength band necessary to excite the specimen S among lights which have passed through the collector lens 5.

On the optical path of the light which has passed through the excitation filter 6, a dichroic mirror 7 is disposed at a position intersecting with the observation optical path a. The dichroic mirror 7 has characteristics to reflect light which has passed through the excitation filter 6 and which has a wavelength band necessary to excite the specimen S, and to transmit fluorescence emitted from the specimen S.

The objective lens 3 is disposed on a reflected light path of the dichroic mirror 7. The objective lens 3 condenses and applies excitation light reflected by the dichroic mirror 7 onto the specimen S. The excitation light causes the specimen S to generate light which is shifted to a wavelength side longer than the wavelength of the excitation light.

A barrier filter 8 and an optical path changer 9 that configure an observation optical system are disposed on a transmitted optical path of the dichroic mirror 7. The barrier filter 8 cuts light other than light having a band of the fluorescence to obtain an observation image with a satisfactory S/N. An optical path changing motor 13 to drive the optical path changer 9 is connected to the optical path changer 9. The optical path changer 9 allows the optical path of the observation image to be changed to an eyepiece 10 included in the observation optical system or to a CCD camera 11 as imaging means.

An LED driver 14 is connected to the LED 4. The LED driver 14 performs drive control to turn on and turn off the LED 4.

A camera controller 15 is connected to the CCD camera 11. The camera controller 15 performs various kinds of control over the CCD camera 11.

Figure 2:
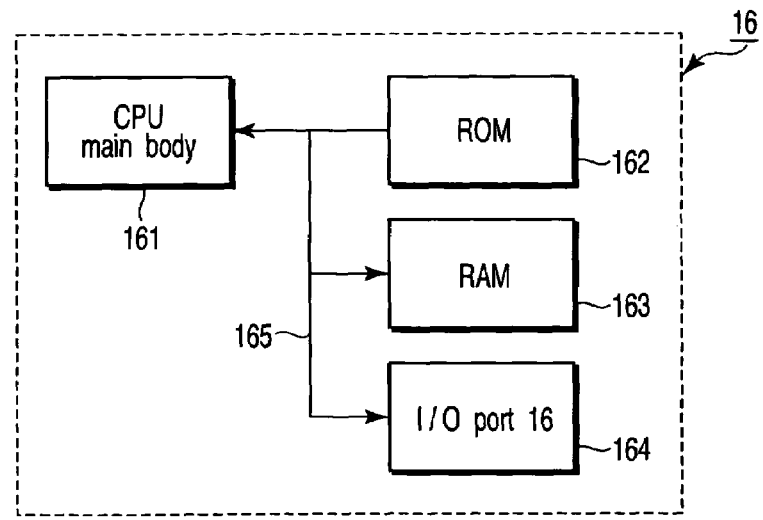
FIG. 2 is a diagram showing a schematic configuration of a controller used in the first embodiment.

A controller 16 is connected to the optical path changing motor 13, the LED driver 14 and the camera controller 15. The controller 16 comprises a well-known CPU circuit. As shown in FIG. 2, the controller 16 has a CPU main body 161, a ROM 162 storing a program to control the system, a RAM 163 comprising a volatile memory or the like to store data necessary for control, an oscillator (not shown) needed to control an I/O port 164 for input/output of control signals and the whole controller 16, and known peripheral circuits such as an address decoder. The CPU main body 161, the ROM 162, the RAM 163 and the I/O port 164 are connected by a data bus 165. Control is made, from the I/O port 164, over peripheral devices including the optical path changing motor 13, the LED driver 14 and the camera controller 15.

An operation unit 17 is connected to the controller 16. The operation unit 17 comprises various operation switches (not shown) to be operated by an observer. The observer operates the operation switches so that the LED driver 14 starts the drive control to turn on or turn off the LED 4, and via the controller 16, for example, the optical path changing motor 13 can perform control to change the observation optical path of the optical path changer 9, and the camera controller 15 can operate photographing timing and exposure time of the COD camera 11.

An operation in the embodiment having a configuration as above will be described.

In the case of visual fluorescence observation, when the observer presses a fluorescence observation mode switch (not shown) on the control unit 17, the controller 16 moves a prism (not shown) in the optical path changer 9 via the optical path changing motor 13 to change the observation optical path to the side of the eyepiece 10. At the same time, the LED 4 of the illumination light source is lit by the LED driver 14.

When the LED 4 emits light, this light is converted into parallel light by the collector lens 5, and the excitation filter 6 transmits light having a wavelength band necessary to excite the specimen S. This light is then reflected by the dichroic mirror 7 and applied to the surface of the specimen S via the objective lens 3.

Light produced in the specimen S by the excitation light passes the dichroic mirror 7, and enters the barrier filter 8 where light other than light having a band of the fluorescence is cut. Thus, fluorescence reaches the eyepiece 10 via the optical path changer 9 and is visually observed as a fluorescence observation image.

In the case of photographing the fluorescence observation image, when the observer presses a photographing mode switch (not shown) on the operation unit 17, the controller 16 moves the prism (not shown) in the optical path changer 9 via the optical path changing motor 13 to change the observation optical path to the side of the COD camera 11. At the same time, the LED 4 is once turned off by the LED driver 14, and preparation for photographing is completed.

Beginning with this state, the observation image is photographed. An operation in this case will be described referring to FIG. 3.

Figure 3:
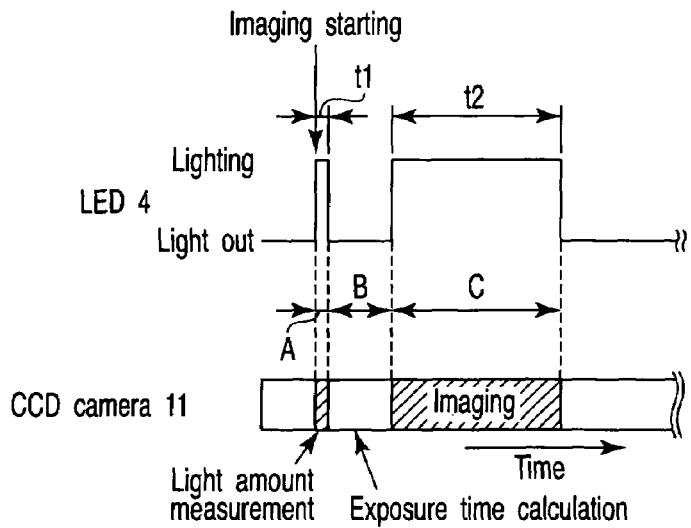
FIG. 3 is a time chart to explain an operation in the first embodiment.

When the observer presses a photographing start switch on the operation unit 17, the controller 16 issues to the camera controller 15 an instruction to set the exposure time, so that the LED 4 lights only for an extremely short time t1 via the LED driver 14 (period A in FIG. 3). The time to light the LED 4 is preset, and during this lighting time, the COD camera 11 performs photometry for optimal exposure adjustment during photographing. Desirably, the lighting time t1 for photometry is as short as possible considering dark output noise and other electric noise of the COD camera 11.

Next, the camera controller 15 uses photometric information in the COD camera 11 to calculate exposure time optimal for photographing, and notifies the controller 16 of the calculated exposure time (period B in FIG. 3). During this period, the LED 4 turns off.

Under the control of the controller 16, the LED 4 lights via the LED driver 14 only for a time t2 corresponding to the exposure time notified of by the camera controller 15, and the fluorescence observation image picked up is loaded from the CCD camera 11 via the camera controller 15 (period C in FIG. 3).

As described above, the LED 4 with satisfactory response speed and luminance stability is used as the illumination light source of the microscope, so that, for example, when the fluorescence observation image is photographed by the CCD camera 11, the LED 4 can be lit only for a period corresponding to photometric time for the optimal exposure adjustment during photographing and for an imaging period corresponding to the optimal exposure time set in accordance with the photometric information, thereby enabling excitation light illumination. This allows the LED 4 to be lit effectively only for a minimum required time as compared with a case where a mercury lamp or a halogen lamp used as a conventional light source is combined with a mechanical shutter and where the excitation light is blocked only by the operation of the mechanical shutter. This permits a significant reduction in unnecessary fading of the fluorescence of the specimen S and a significant reduction in power consumption achieving power saving.

Furthermore, because the excitation light illumination can be turned on/off by controlling turning on and turning off of the LED 4, erroneous operations can be eliminated as compared with the conventional case in which the mechanical shutter is used. Moreover, the LED 4 is superior in operability and can be made small as the illumination light source, so that lower costs and smaller size can be achieved in the whole microscope.

(First Modification)

A first modification of the first embodiment will be described referring to FIG. 4.

The fluorescent microscope applied to the first modification is the same as that in FIG. 1, and FIG. 1 is thus incorporated by reference.

In the fluorescence observation, there is a method called time-lapse photography to photograph changes in a biological sample over time, for example.

When such a photography method is requested, if the observer presses a time-lapse photography start switch (not shown) on the operation unit 17, the controller 16, as described above, issues to the camera controller 15 an instruction to set the exposure time, so that the LED 4 lights only for an extremely short time t11 (period A in FIG. 4), and photometry is performed for the optimal exposure adjustment during photographing.

Figure 4:
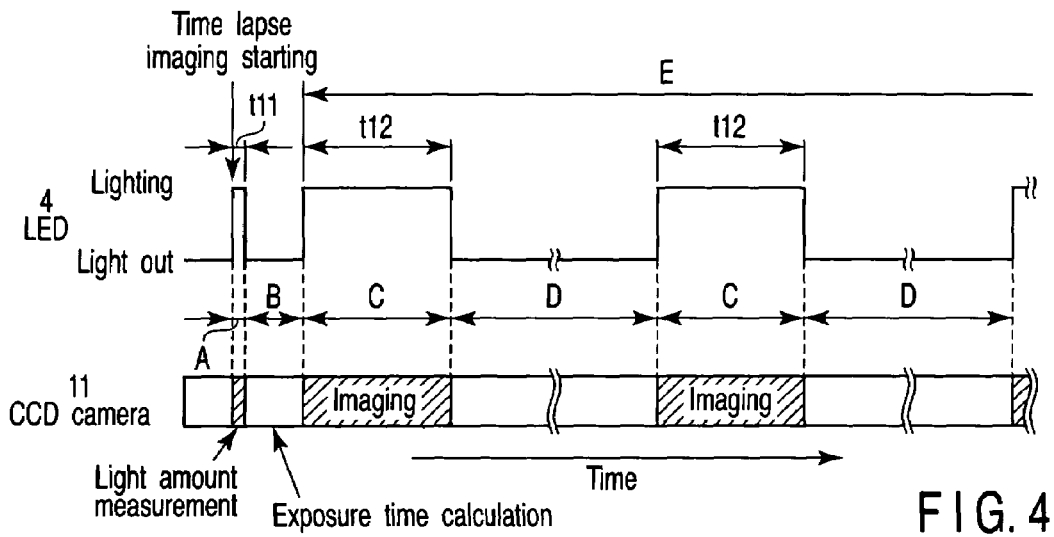
FIG. 4 is a time chart to explain an operation in a first modification of the first embodiment.

Next, the camera controller 15 uses photometric information in the CCD camera 11 to calculate exposure time optimal for photographing, and notifies the controller 16 of this exposure time (period B in FIG. 4).

Subsequently, the controller 16 causes the LED 4 to light for a time t12 corresponding to the given exposure time as a photographing period, and the fluorescence observation image picked up by the CCD camera 11 is loaded (period C in FIG. 4). Thereafter, the same operation is repeated (period D in FIG. 4) at predetermined intervals over a certain period (period E in FIG. 4).

Also in the first modification, the LED 4 is used as the illumination light source, and the excitation light illumination is performed by lighting the LED 4 only for a period corresponding to the photometric time for the optimal exposure adjustment and for the imaging period corresponding to the optimal exposure time set in accordance with the photometric information, whereas the LED 4 turns off for a calculation period of the exposure time (period B in FIG. 4) and for an idle period (period D in FIG. 4) between imaging periods, thereby allowing the same effects as in the first embodiment to be obtained.

Intervals and the number of times of photographing here may be pre-stored in the ROM 162 within the controller 16, or may be set by the observer using a photographing state setting switch provided in the operation unit 17.

(Second Modification)

A second modification of the present embodiment will be described referring to FIG. 5.

The fluorescent microscope applied to the second modification is the same as that in FIG. 1, and FIG. 1 is thus incorporated by reference.

When it is desired to take a plurality of pictures of the same sample at different exposures, a method called autobracket photography is used. In the photography method according to the second modification, pictures whose exposure times are slightly different in long and short directions from a predetermined exposure value are taken in one action. In this case, the observer optionally sets the number of pictures to be taken and differences in the respective exposure times, for example.

When the photography method according to the second modification is requested, the observer presses an autobracket photography start switch (not shown) on the operation unit 17, and the controller 16, as described above, issues to the camera controller 15 an instruction to set the exposure time, so that the LED 4 lights only for an extremely short time t21 (period A in FIG. 5), and photometry is performed for the optimal exposure adjustment during photographing.

Figure 5:
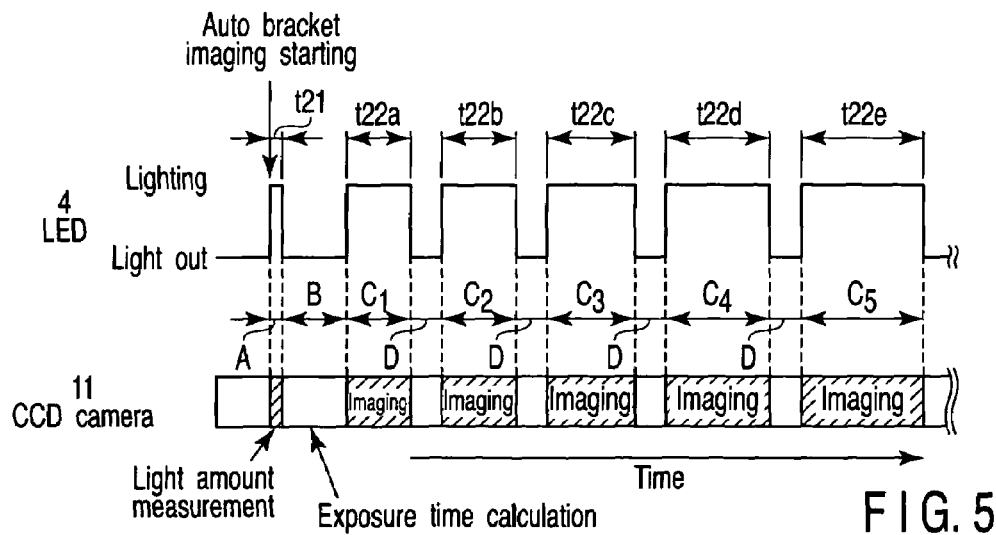
FIG. 5 is a time chart to explain an operation in a second modification of the first embodiment.

Next, the camera controller 15 uses the photometric information in the CCD camera 11 to calculate exposure time optimal for photographing, and notifies the controller 16 of this exposure time (period B in FIG. 5).

Subsequently, the controller 16 obtains times t22$a$, t22$b$, t22$c$, t22$d$, t22$e$ that are different by time differences $-2\alpha$, $-\alpha$, 1, $\alpha$, $2\alpha$, respectively, with reference to the given exposure time, and the LED 4 lights for these times t22$a$, t22$b$, t22$c$, t22$d$, t22$e$ as imaging periods, and then the fluorescence observation images picked up by the CCD camera 11 are loaded. In this case, the respective calculated imaging periods are indicated by $C_1$ to Cs in FIG. 5, and the idle periods between the imaging periods are indicated by D in FIG. 5.

Therefore, even in such a manner, the LED 4 is used as the illumination light source, and the excitation light illumination is performed by lighting the LED 4 only for a period corresponding to the photometric time for the optimal exposure adjustment and for the imaging period corresponding to the optimal exposure time set in accordance with the photometric information, whereas the LED 4 turns off for a calculation period of the exposure time (period B in FIG. 5) and for an idle period (period D in FIG. 5) between the imaging periods, thereby allowing the same effects as in the above-described first embodiment to be obtained.

It is to be noted that the idle period (period D in FIG. 5) between the imaging periods is desirably set to be the shortest on the condition that time to complete the preparation for the next photography in the CCD camera 11 is fulfilled. Moreover, values of the exposure time differences a and the number of times of photographing may be pre-stored in the ROM 162 within the controller 16, or may be set by the observer using the photographing state setting switch provided in the operation unit 17.

Second Embodiment

A second embodiment of the present invention will be described referring to FIG. 6.

Figure 6:
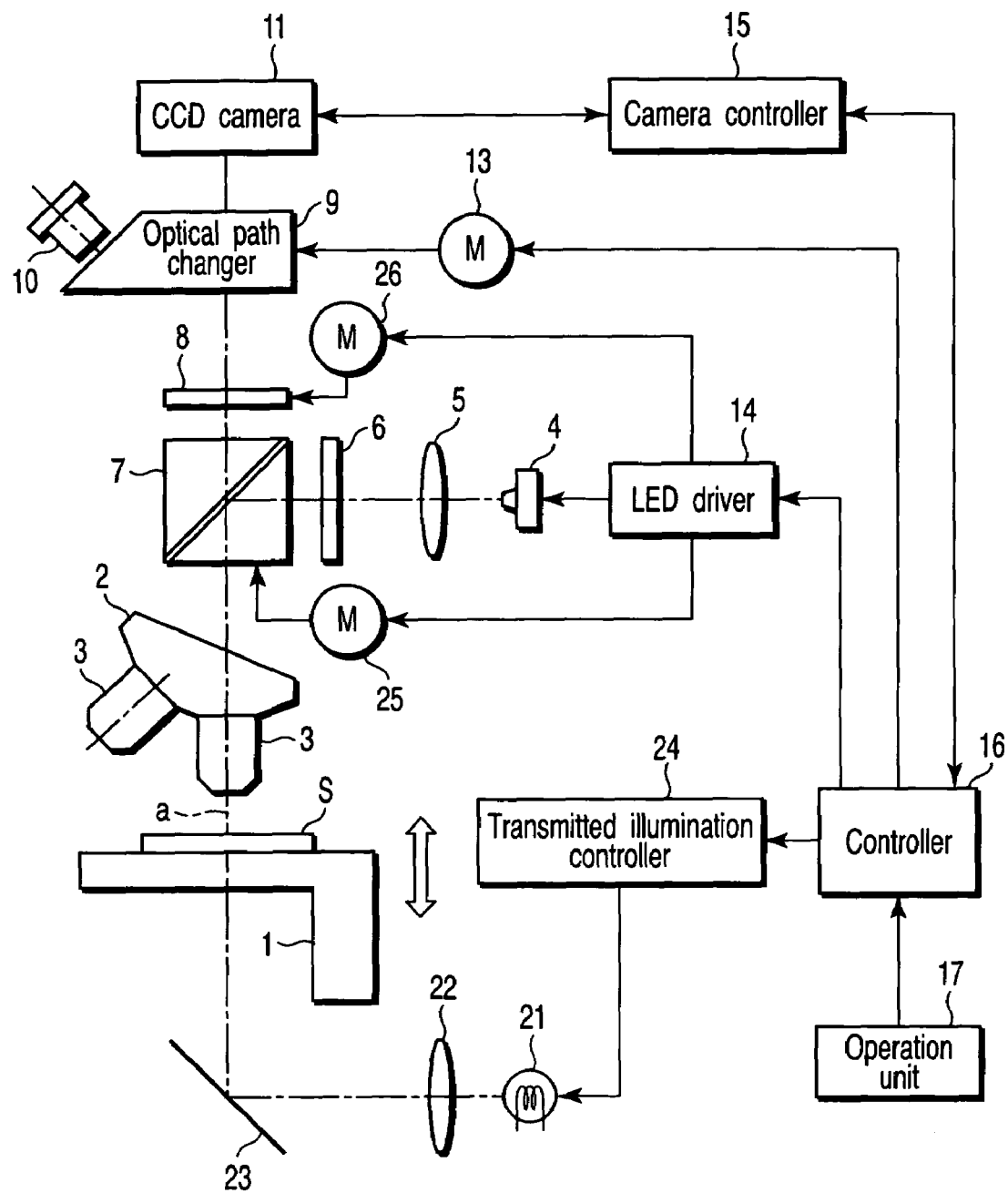
FIG. 6 is a diagram showing a schematic configuration of the fluorescent microscope according to a second embodiment of the present invention.

FIG. 6 is a diagram showing a schematic configuration of the fluorescent microscope according to a second embodiment of the present invention, in which the same signs are given to the same parts as those in FIG. 1.

The second embodiment is different from the first embodiment in that a transmitted illumination system as illumination means is added in addition to the LED 4 used for the fluorescence observation. In FIG. 6, a mercury lamp, a halogen lamp or the like is used for a transmitted illumination light source 21 as a second light source.

A transmitted illumination collector lens 22 and a reflection mirror 23 are disposed on an optical path of light emitted from the transmitted illumination light source 21. The transmitted illumination collector lens 22 converts the light from the transmitted illumination light source 21 into parallel light. The reflection mirror 23 reflects the parallel light from the transmitted illumination collector lens 22, thereby enabling the transmitted illumination of the specimen S from beneath.

A transmitted illumination controller 24 is connected to the transmitted illumination light source 21. The transmitted illumination controller 24 controls, in accordance with an instruction from the controller 16, the transmitted illumination performed by the transmitted illumination light source 21.

Driving motors 25, 26 are provided for the dichroic mirror 7 and the barrier filter 8 which are optical elements for the fluorescence observation, respectively, and can be brought in and out of the optical path in accordance with the instruction from the controller 16.

In the configuration as described above, when an observation method other than the fluorescence observation is implemented using the transmitted illumination, if the observer presses an observation method changing switch on the operation unit 17, the transmitted illumination light source 21 continuously turns on via the transmitted illumination controller 24 while the LED 4 turns off via the LED driver 14, under the control of the controller 16. The dichroic mirror 7 and the barrier filter 8 are evacuated from the optical path via the driving motor 25, 26.

When the LED 4 is used to perform the fluorescence observation, if the observer presses the observation method changing switch on the operation unit 17, the transmitted illumination light source 21 turns off via the transmitted illumination controller 24 while the dichroic mirror 7 and the barrier filter 8 are brought again into the optical path via the driving motor 25, 26, under the control of the controller 16. Furthermore, the LED 4 turns on via the LED driver 14 to start producing the excitation light for the specimen S.

In such a manner as described above, synchronously with the change of observation methods, the optical elements such as the dichroic mirror 7 and the barrier filter 8 can be brought in and out of the optical path and the LED 4 of the illumination light source can turn on or turn off. Thus, even in the observation other than the conventional fluorescence observation, significant power saving can be expected as compared with the conventional microscopes in which the continuously lighting mercury lamp or the like is only blocked by the mechanical shutter. Further, the fluorescence observation can be rapidly started owing to high-speed response of the LED 4, so that if the observation method using the transmitted illumination is combined, the illumination can also be rapidly and efficiently changed when the fluorescence observation is changed to other observation methods. Thus, beneficial effects can be expected not only in operability but also in power saving.

The mercury lamp or the halogen lamp is used as the transmitted illumination light source 21 in the second embodiment, but a small light emitting element such as a white LED may be used. If the white LED is used as the transmitted illumination light source, observation can be rapidly changed with no remaining transmitted light immediately after the start of fluorescence observation because turn off time is shorter than that of the mercury lamp or the halogen lamp. The second embodiment has been described on the assumption that the observation method based on the transmitted illumination other than the fluorescence observation is implemented in a bright field, but known observation methods of the microscope such as dark field observation, polarization observation and differential interference (Nomarski) observation can also benefit from the present invention. In this case, if optical elements corresponding to the respective observation methods such as a polarizing plate, a Nomarski prism and a dark field observation condenser are electrically driven so that they can be automatically placed in and out of the optical path during the changeover from/to the fluorescence observation, the observation methods can be efficiently changed without the observer taking care of the combination of optical elements.

Third Embodiment

A third embodiment of the present invention will next be described.

The third embodiment is concerned with turn off timing of the LED 4 which performs the excitation light illumination. The LED 4 turns off at the moment of photography by the CCD camera 11 in the first and second embodiments, but the third embodiment is applied to the case where the observer performs the fluorescence observation with the naked eye via the eyepiece 10. If the excitation light illuminated during observation is blocked each time the observer is not looking through the eyepiece 10, that is, each time the observation is discontinued, fading of the specimen can be reduced. However, in effect, when the observation is frequently continued/discontinued repetitively, it requires time and labor if a turn off switch on the operation unit 17 is operated to turn off the LED 4 each time, and therefore, the excitation light is often illuminated continuously. Moreover, the observer might forget to block the excitation light to inadvertently fade the specimen, resulting in a waste of specimen itself.

Figure 7A:
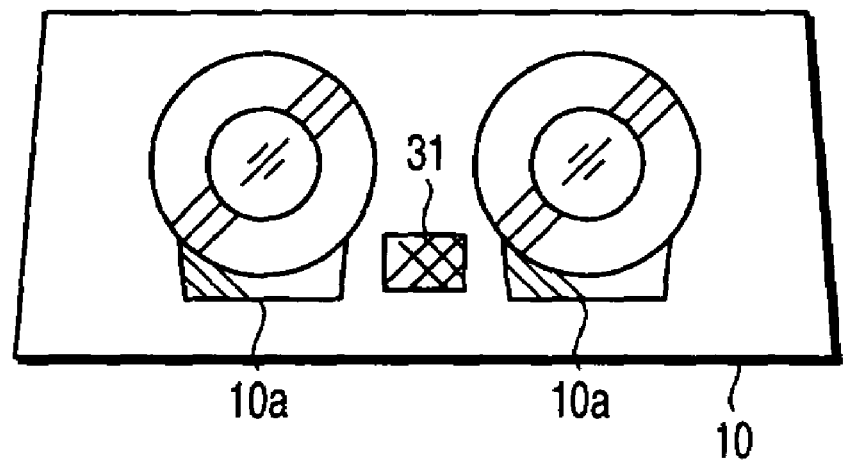
FIG. 7A and FIG. 7B are diagrams showing a schematic configuration of essential parts of the fluorescent microscope according to a third embodiment of the present invention.
Figure 7B:
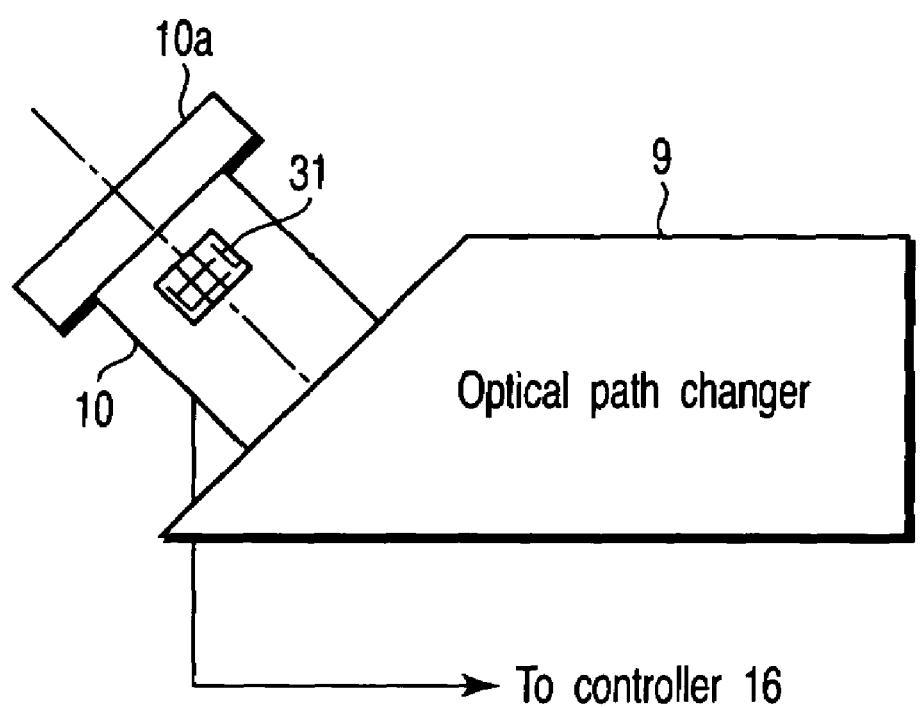

In the third embodiment, a sensor 31 is provided in the vicinity of an observation window iGa of the eyepiece 10 for the observer shown in FIG. 7A and FIG. 7B. When the observer brings his face close to the observation window iGa of the eyepiece 10, the sensor 31 outputs a signal at a voltage level corresponding to ON, while the sensor 31 outputs a signal at a voltage level corresponding to OFF when the observer moves away. The signal from the sensor 31 is given to the controller 16. For the sensor 31, known elements are used, such as an infrared sensor which reacts to objects moving on the periphery thereof, and a photo detector element which detects a reduction in the amount of peripheral light due to the approached face. Moreover, in order to prevent the LED 4 from unnecessarily turning on and turning off due to changes in the position of the face of the observer, it is possible to add a function to prevent erroneous operations by adding hysteresis characteristics in which the LED 4 is turned on after the ON signal is detected for a predetermined time or longer or in which the LED 4 is not turned off if OFF is not continuously detected for a predetermined time after the ON signal is once detected.

If the ON signal from the sensor 31 is detected while the fluorescence observation is being selected by the observation changing switch on the control unit 17 under the control of the controller 16, the LED 4 lights via the LED driver 14, and the LED 4 lights out if the OFF signal is detected.

In the third embodiment, the LED 4 turns on only when the observer is observing a fluorescence image from the observation window 10a of the eyepiece 10, and at other times it is possible to actively turn off the LED 4. This makes it possible to eliminate unnecessary excitation light applied to the specimen S and to avoid inadvertent fading of the specimen S. Moreover, because the LED 4 is automatically turned on or turned off, operational errors caused by the observer due to troublesome operations can be prevented from occurring.

The present invention is not limited to the embodiments described above, and various modifications can be made in an implementation phase without changing the spirit thereof. For example, in the first and second embodiments, the various switches provided in the operation unit 17 are used to perform the operations associated with the change of the observation optical paths and with photographing, but the same effects can be obtained if they are set by communication commands from a host PC connected to the controller 16, for example.

According to the present invention, the small light emitting element with satisfactory response speed and luminance stability is used as the illumination light source of the microscope, so that the small light emitting element lights effectively to perform excitation light irradiation only for a minimum required period during observation or photography. This permits a reduction in unnecessary fading of the specimen due to unnecessary excitation light irradiation and a significant reduction in power consumption achieving power saving.

Furthermore, according to the present invention, the illumination can be efficiently and rapidly changed when the fluorescence observation is changed to other observation methods, thereby making it possible to obtain beneficial effects not only in operability but also in power saving.

Still further, according to the present invention, the small light emitting element lights for the excitation light irradiation only when the observer is performing the fluorescence observation, which can reduce fading of the specimen due to the wasteful excitation light irradiation and achieve power saving.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A fluorescent microscope comprising:
    a transmitted illumination optical system which includes a transmitted illumination light source and performs transmitted illumination;
    an LED light source which turns on and off in response to a rectangular drive signal at high speed;
    a fluorescence excitation optical system which leads light from the LED light source onto a specimen to perform epifluorescent illumination;
    an observation optical system to which fluorescence emitted from the specimen or transmitted light that has passed through the specimen is led;
    an imager which images the fluorescence or the transmitted light led to the observation optical system; and
    a controller which: (i) controls the LED light source to be turned on during a first period and turned off during a second period when performing the epifluorescent illumination, wherein the first period includes a photometry period in which photometry is performed to calculate an optimal exposure time during photographing and a photographing period in which photographing is performed with the calculated optimal exposure time, and wherein the second period includes a period from after ending of the photometry period to starting of the photographing period, and (ii) controls the LED light source to be turned off while continuously lighting the transmitted illumination light source when performing the transmitted illumination.

2. The fluorescent microscope according to claim 1, further comprising a fluorescence observation detector which detects whether or not an observer is performing fluorescence observation,
    wherein the controller controls the turning on and turning off of the LED light source by a driver of the LED light source in accordance with an output of the fluorescence observation detector.

3. The fluorescent microscope according to claim 2, wherein the observation optical system comprises an eyepiece, and the fluorescence observation detector detects whether or not the observer is performing the fluorescence observation with the eyepiece.

4. The fluorescent microscope according to claim 3, wherein the fluorescence observation detector comprises a proximity sensor.

5. The fluorescent microscope according to claim 1, wherein, when a same specimen is photographed plural times, the controller turns off the LED light source during an idle period from after a first photographing period to starting of a next photographing period, and turns on the LED light source during the next photographing period in performing the epifluorescent illumination.

6. A fluorescent microscope comprising:
    a first LED light source which turns on and turns off in response to a rectangular drive signal at high speed;
    a fluorescence excitation optical system which includes a dichroic mirror and leads light from the first LED light source onto a specimen;
    a transmitted illumination unit, having a second light source for transmitted illumination that is different from the first LED light source, which illuminates the specimen with light from the second light source;
    an observation optical system to which transmitted light that has passed through the specimen or fluorescence emitted from the specimen and passed through a barrier filter is led;
    an imager which images the transmitted light or fluorescence led to the observation optical system; and
    a controller which controls the first LED light source to be turned off while continuously lighting the second light source with the dichroic mirror and barrier filter evacuated from the observation optical system when performing a transmitted illumination observation using the second light source, controls the second light source to be turned off with the dichroic mirror and barrier filter inserted into the observation optical system when performing a fluorescence observation using the first LED light source, controls the first LED light source to be turned on during a first period, and controls the first LED light source to be turned off during a second period, wherein the first period includes a photometry period in which photometry is performed to calculate an optimal exposure time during photographing and a photographing period in which photographing is performed with the calculated optimal exposure time, and wherein the second period includes a period from after ending of the photometry period to starting of the photographing period.

7. The fluorescent microscope according to claim 6, further comprising a fluorescence observation detector which detects whether or not an observer is performing fluorescence observation,
wherein the controller controls the turning on and turning off of the first LED light source by a driver of the first LED light source in accordance with an output of the fluorescence observation detector, controls an image timing and an exposure time of an imager, and controls the turning on and turning off of the second light source by a driver of the second light source.

8. The fluorescent microscope according to claim 7, wherein the observation optical system comprises an eyepiece, and the fluorescence observation detector detects whether or not the observer is performing the fluorescence observation with the eyepiece.

9. The fluorescent microscope according to claim 8, wherein the fluorescence observation detector comprises a proximity sensor.

10. The fluorescent microscope according to claim 6, wherein, when a same specimen is photographed plural times, the controller turns off the first LED light source during an idle period from after a first photographing period to starting of a next photographing period, and turns on the first LED light source during the next photographing period, in performing the fluorescence observation.

* * * * *